United States Patent [19]

Hirakawa et al.

[11] 4,238,024
[45] Dec. 9, 1980

[54] CONVEYOR DEVICE

[75] Inventors: Tadashi Hirakawa, Mihara, Japan; Kiyomitsu Yoshikawa, Cockeysville, Md.; Toshiaki Kusubayashi, Mihara, Japan

[73] Assignee: Mitsubishi Jukogyo Kabushiki Kaisha, Tokyo, Japan

[21] Appl. No.: 57,809

[22] Filed: Jul. 16, 1979

[51] Int. Cl.³ .................... B65G 47/26; B65H 5/24
[52] U.S. Cl. .................................. 198/425; 198/423; 271/189; 271/203
[58] Field of Search ............... 198/425, 423, 461, 440, 198/447; 271/190, 189, 182, 202, 203, 216

[56] References Cited

U.S. PATENT DOCUMENTS

| 3,403,772 | 10/1968 | Vadas | 198/425 |
| 3,688,890 | 9/1972 | Brockmuller |  |
| 3,807,553 | 4/1974 | Billet et al. | 271/190 |
| 3,851,748 | 12/1974 | Garton |  |
| 3,911,800 | 10/1975 | Feldkamper |  |

FOREIGN PATENT DOCUMENTS

| 1148437 | 5/1963 | Fed. Rep. of Germany | 271/202 |
| 2713895 | 10/1977 | Fed. Rep. of Germany | 198/425 |

Primary Examiner—Robert B. Reeves
Assistant Examiner—Brian Bond
Attorney, Agent, or Firm—Bernard & Brown

[57] ABSTRACT

A continuously moving supply conveyor delivers articles to be separated or batched to a sorting conveyor. The sorting conveyor includes a first conveyor and a second conveyor arranged to move about common spaced axes. The first conveyor includes an endless belt mounted on rollers and arranged to follow a first path. The second conveyor includes sprockets mounted on shafts of the rollers and having a diameter greater than that of the rollers. Chains engage the sprockets and support a belt for movement along a path outside that of the first conveyor. The first conveyor comprises a continuous belt extending the full length thereof. The second conveyor includes a belt extending through only a portion of the total length of the second conveyor. Means are provided for driving the first and second conveyors in the same direction but at different speeds. When it is desired to separate a second batch from a preceding first batch the belt portion of the second conveyor is caused to move into a position above the first conveyor thereby separating articles or sheets being delivered from the supply conveyor into a batch separate from the batch delivered by the first conveyor to the transport conveyor.

10 Claims, 18 Drawing Figures

U.S. Patent  Dec. 9, 1980  Sheet 1 of 4  4,238,024
FIG 1
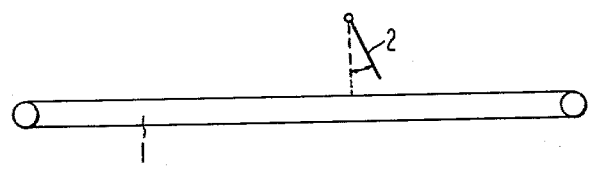
FIG 2(A)
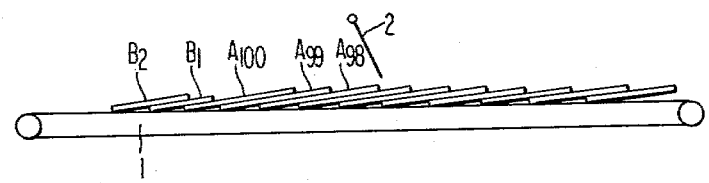
FIG 2(B)
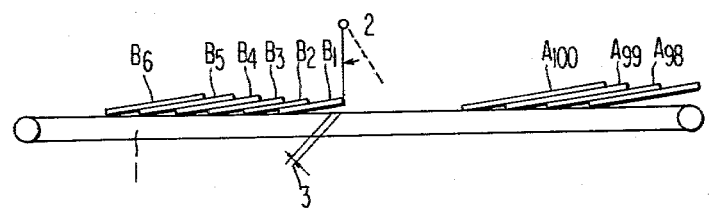
FIG 2(C)
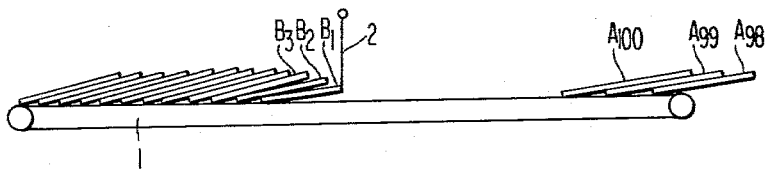
FIG 2(D)
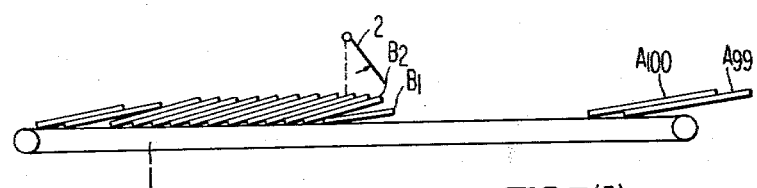
PRIOR ART
FIG 3(A)
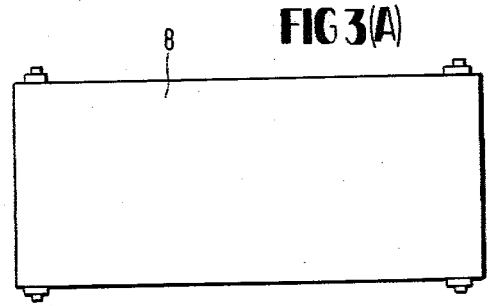
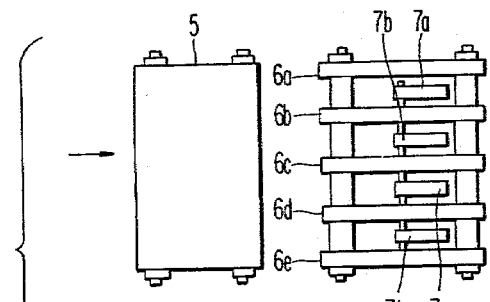
PRIOR ART
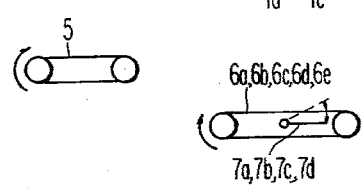
FIG 3(B)

PRIOR ART

CONVEYOR DEVICE

BACKGROUND OF THE INVENTION

1. Field of the Invention

This invention relates to conveyor devices and more particularly to such devices arranged for separating a continuous flow of articles into separate batches containing a desired number of such articles.

2. Description of the Prior Art

In the past, the separation of articles, particularly flat objects or sheets, which are continuously fed, into separate batches of desired size was accomplished by a number of devices such as are shown in FIGS. 1 to 4 of the present application. The identification of the figures illustrating the prior art and being here described is given in a later section of this application under the heading Brief Description of the Drawings. In the prior art structure shown in FIG. 1 and in FIGS. 2(A), (B), (C) and (D), there is shown a transport conveyor 1 and a sorting lever 2. With this type of apparatus, as is best shown in FIGS. 2(A), (B), (C) and (D), the articles or sheets travelled at a constant speed in the direction of arrow 4. To separate the first batch ( . . . $A_{98}$, $A_{99}$, $A_{100}$) from the next batch which followed ($B_1$, $B_2$, $B_3$ . . . ), it was necessary to sort them by opening or closing the sorting lever 2.

With this structure, however, the timing of the movement of the sorting lever 2 was important. As shown in FIG. 2(B), through variation of the space 3, it was likely that some sheets of the first batch (for example $A_{100}$) would become mixed with the sheets of the succeeding batch and an accurate separating was difficult. Also, since the sorting lever 2 would cause the sheets of the succeeding batch ($B_1$, etc.) to stop, there was the probability that the front edge of that batch would be damaged or that the sheets would be piled up as illustrated in FIG. 2(C). The latter result would cause the final arrangement of the sheets to be in bad array.

Another type of prior art conveyor apparatus is shown in FIGS. 3(A) and 3(B) and in FIGS. 4(A), 4(B), 4(C) and 4(D). The conveyor device shown in these Figures includes a supply conveyor 5, a sorting conveyor which includes belts 6a, 6b, 6c, 6d and 6e, sorting levers 7a, 7b, 7c and 7d, one such sorting lever being interposed between each pair of belts, and a transport conveyor 8. The supply conveyor is run at high speed while the sorting conveyor, including belts 6a, 6b, 6c, 6d and 6e, is run at a speed of about 20 to 50 percent of supply conveyor 5.

The functioning of this prior art conveyor device is best seen in FIGS. 4(A), 4(B), 4(C), and 4(D). These Figures show that when batch A is being sorted or separated from batch B, as the last sheet ($A_{100}$) of the former batch ( . . . $A_{98}$, $A_{99}$, $A_{100}$) passes the levers 7a-7d, the levers 7a-7d rise with respect to batch B ($B_1$, $B_2$, $B_3$ . . . ) and, as FIG. 4(B) shows, $B_1$ is pushed up. Through the friction of the levers 7a-7d, misalignment and jamming shown in FIG. 4(C) can occur. The sorting conveyor including belts 6a-6e and transport conveyor 8 carry the sheets to the sites of processing, but the aforementioned batch B must be stopped, even though the belts are still moving, before it can be sent on to processing so that it can be properly realigned.

As is shown in FIGS. 3 and 4, conveyor devices used in the past which employed rising levers had to have precise timing to avoid mixing the last sheet of one batch (for example $A_{100}$) with the first sheet of the following batch (for example $B_1$). It was difficult to accurately separate these sheets into the desired batches. Also, because the sorting levers 7a-7d necessarily stopped the flow of the sheets, there was not a constant spacing of the sheets or articles in the pile, as is shown in FIG. 4(C). This caused disarray in the later processing of the article because the sheets would not be aligned.

Also, as FIG. 4(C) shows, the front edge of one article or sheet (for example $B_6$) may lie against the back edge of the preceding sheet ($B_5$) so that the flow of even later articles in the desired batch would be disturbed. Finally, as shown in FIG. 4(D), in order that the levers 7a-7d function as desired it is necessary that the edges thereof be higher than the surface of the sorting conveyor belts 6a-6e. It was, therefore, impossible, as shown in FIG. 3(A), for the sorting conveyor to have a full width conveyor belt. This made it impossible to apply a uniform braking power to the flat objects, further contributing to the disarray of the objects in the batch.

By the present invention these deficiencies of prior art conveyor devices have been eliminated and a conveyor device is provided which permits precise separation between the sheets or other articles in one batch and those in the following batch and which avoids misalignment and jamming of the articles. Any misalignment would have to be corrected in later processing, resulting in additional expense and perhaps requiring the temporary shutting down of the conveyor or the slowing of the conveyor. The conveyor structure of this invention is that of a twin-level or a multi-level conveyor in which the speeds of each component can be controlled. A conveyor structure is provided in which the position of the sorted or batched articles is accurate and it reduces disarray or misalignment in them to the absolute minimum.

SUMMARY OF THE INVENTION

In carrying out this invention, in one form thereof, there is provided a continuously moving supply conveyor which delivers articles to be separated or batched to a sorting conveyor. The sorting conveyor includes a first conveyor and a second conveyor arranged to move about common spaced axes. The first conveyor is arranged to follow a first path and the second conveyor is arranged to follow a path outside that of the first conveyor. The first conveyor comprises a continuous belt extending the full length thereof. The second conveyor includes a belt extending through only a portion of the total length of the second conveyor. When it is desired to separate a second batch from a preceding first batch the belt portion of the second conveyor is caused to move into a position above the first conveyor thereby separating articles or sheets being delivered from the supply conveyor into a batch separate from the batch delivered by the first conveyor to the transport conveyor.

BRIEF DESCRIPTION OF THE DRAWING

FIG. 1 is a side view, in schematic form, of one form of prior art conveyor device. FIGS. 2(A), 2(B), 2(C), and 2(D) illustrate the functioning of the conveyor device shown in FIG. 1.

FIG. 3(A) is a plan view of another form of prior art conveyor device.

FIG. 3(B) is a side view of the conveyor device shown in FIG. 3(A).

DESCRIPTION OF THE PREFERRED EMBODIMENT

Figure 4A:
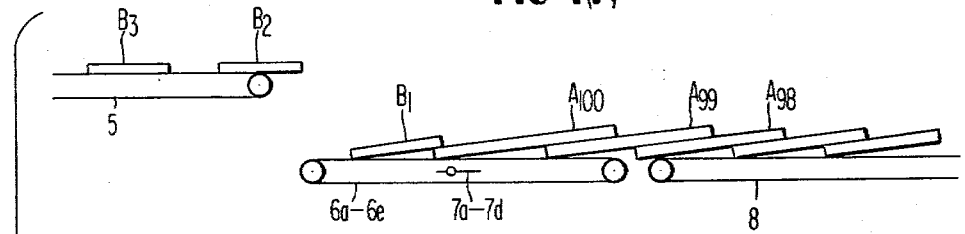
FIGS. 4(A), 4(B), 4(C), and 4(D) illustrate the functioning of the conveyor device shown in FIGS. 3(A) and 3(B).
Figure 4B:
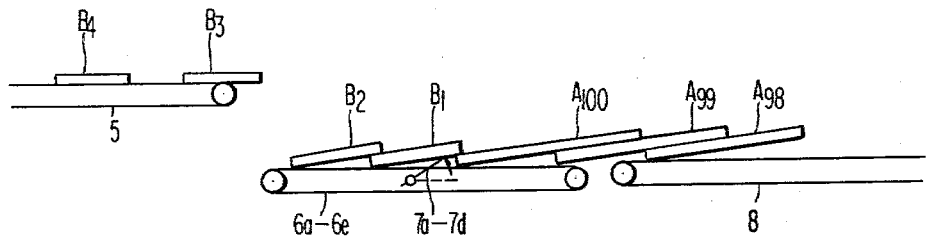
Figure 4C:
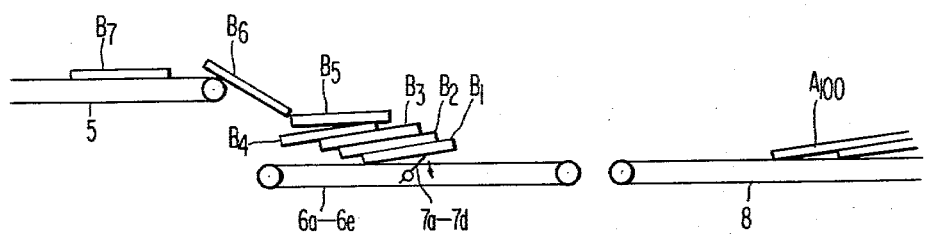
Figure 4D:
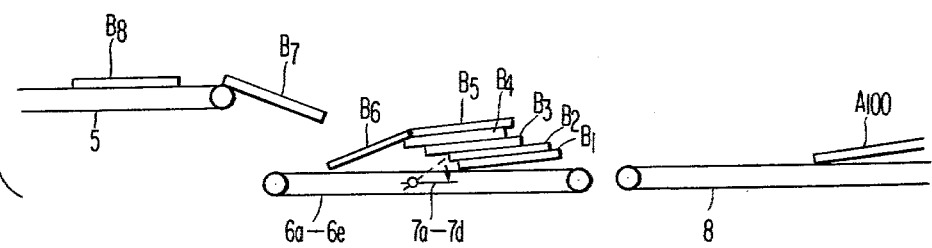

Referring now to FIGS. 5(A) and 5(B) and 6(A), 6(B), 6(C), 6(D) and 6(E), the conveyor device includes a source of articles or sheets to be separated into batches, in the form of a supply conveyor 9a, a sorting conveyor 9b for separating the articles into the desired batches, and a transport conveyor 9c for delivering the separated articles for further processing down the line. The sorting conveyor comprises a first conveyor which includes spaced rollers 10 and 11 arranged for rotation about horizontal axes by means of outwardly extending shafts 16a, 16b and 17a, 17b respectively. An endless belt 12 is wrapped around rollers 10 and 11. The endless belt 12 forms a first conveyor for continuous movement in delivering articles from the supply conveyor 9a to the transport conveyor 9c. The endless belt 12 of the first conveyor follows a path indicated by the solid line in FIG. 5(B).

Figure 5A:
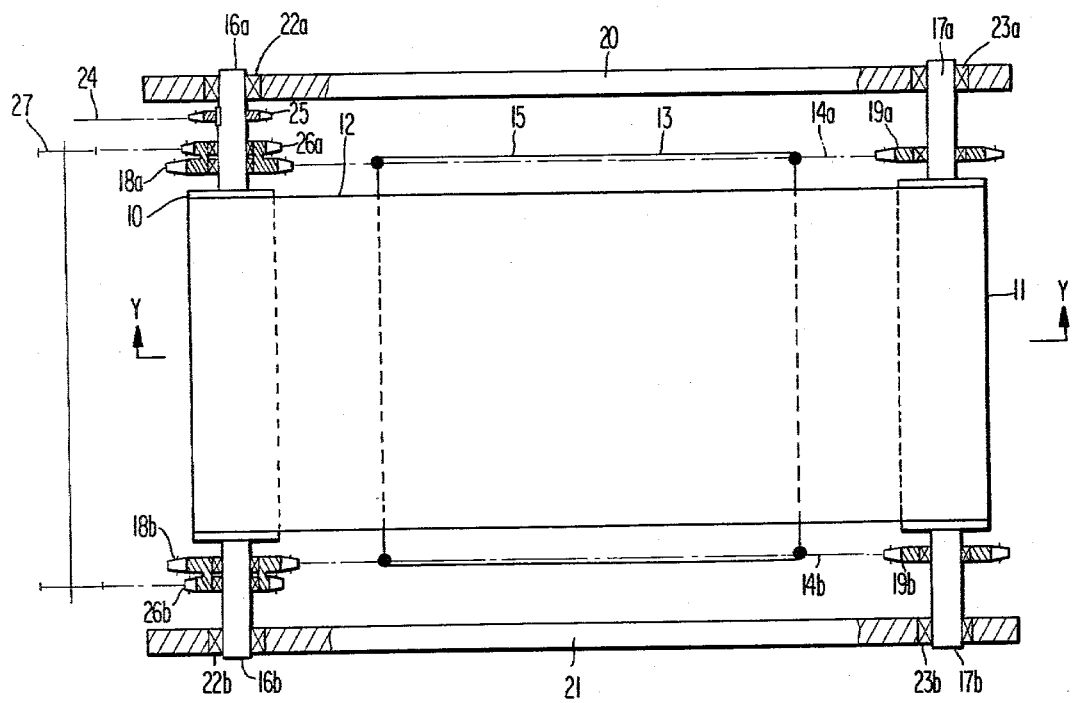
FIG. 5(A) is a plan view of a schematic representation of the conveyor device of the present invention.
Figure 5B:
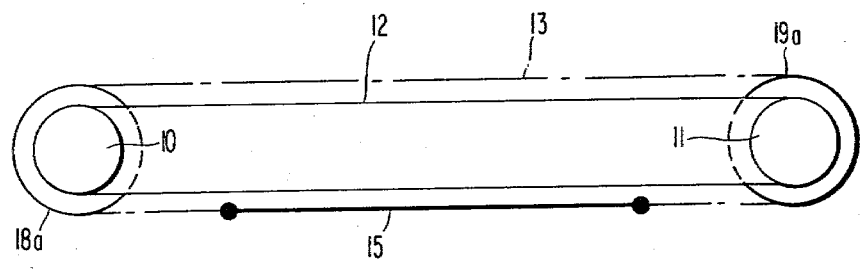
FIG. 5(B) is a view, also in schematic form, of the conveyor device shown in FIG. 5(A), taken generally along the line Y—Y in FIG. 5(A).

The sorting conveyor includes a second conveyor 13 which is arranged to follow a second path, which is indicated by the dash-dot lines in FIG. 5(B) and which extends outside the path of the first conveyor formed by the endless belt 12.

The second conveyor 13 includes a plurality of sprockets 18a, 18b and 19a, 19b. Sprockets 18a and 18b are mounted on shafts 16a and 16b respectively for rotation about the same horizontal axis as roller 10 but are positioned outwardly from roller 10 and are of a larger diameter than that roller. Similarly, sprockets 19a and 19b are positioned on shafts 17a and 17b respectively for rotation about the same horizontal axis as roller 11 and are positioned outwardly from roller 11 and also are of larger diameter than roller 11. The sprockets are mounted so as to permit relative rotation of the sprockets with respect to the rollers 10 and 11 so that, as will be explained later, the two conveyors may be operated at different speeds when desired.

The second conveyor further includes two spaced chains 14a and 14b, the former being arranged in engagement with sprockets 18a and 19a and the latter being arranged in engagement with sprockets 18b and 19b. The second conveyor includes a belt 15 extending between the chains 14a and 14b but unlike belt 12 it is not endless but rather extends only for a portion of the length of the path formed by the chains 14a and 14b. Because the sprockets are, as described earlier, of a larger diameter than the rollers 10 and 11 the belt 15 mounted on the chains 14a and 14b follows a path indicated by the dash-dot line in FIG. 5(B). which is outside the path followed by the endless belt 12. Thus, when the belt 15 is in an upper position it is positioned a specific distance above the belt 12, and it moves in the same direction so that there is a double layer of belt over this area at that time. The belt 15, as illustrated, is made so that its length is shorter than the distance between the axes of the rollers 10 and 11. It will be understood that the distance between the axes of the rollers 10 and 11 and the relationship of the belt 15 thereto is not limited to that shown in the figures. There would be no problem if the length of the belt 15 were greater or smaller than that shown in these figures. The length of the belt 15 can be determined for any specific application by taking the size and the number of the sheets in the batch to be transported into consideration.

The rollers 10 and 11 are rotatably supported on frames 20, 21. Bearings 22a, 22b and 23a, 23b are mounted in the frames 20 and 21 respectively for facilitating easy rotation of the rollers 10, 11. Roller 10 is driven by a suitable drive mechanism 24 which engages a sprocket 25 fixedly mounted on the shaft of the roller 10. Any conventional drive mechanism may be employed, for example a suitably controlled electric motor. Roller 11 is driven by roller 10 through the action of the endless belt 12.

Sprockets 18a and 18b are mounted for free rotation on the shafts 16a and 16b respectively of the roller 10 so that they may rotate freely relative to the roller. They are driven by means of sprockets 26a and 26b which are connected to sprockets 18a and 18b respectively for movement therewith. A suitable drive mechanism 27 is arranged for engagement with the sprockets 26a and 26b for driving the chains and hence the conveyor 13. The specific drive mechanism 27 employed is not critical to this invention and has, therefore, been illustrated only schematically in FIG. 5(A). It could, for example, comprise an electric motor, driving gears which engage the sprockets 26a and 26b. The drive mechanisms 24 and 27 can be selected on the basis of being appropriate to the particular adaptation of the conveyor.

Next, the function of the conveyor device of this invention will be explained. The explanation can be best understood by referring to FIGS. 6(A), 6(B), 6(C), 6(D) and 6(E) which show a first batch C ( . . . $C_{95}$, $C_{96}$, $C_{97}$, $C_{98}$, $C_{99}$, $C_{100}$) being separated from a following batch D ($D_1$, $D_2$, $D_3$, $D_4$, $D_5$, $D_6$ . . . ). During normal operational conditions, the speed of the supply conveyor 9a is VA, and the speed of the first conveyor including endless belt 12 is VB. The speed of the belt 15 of the second conveyor is zero, and the belt 15 maintains the position shown in FIG. 6(A).

Figure 6A:
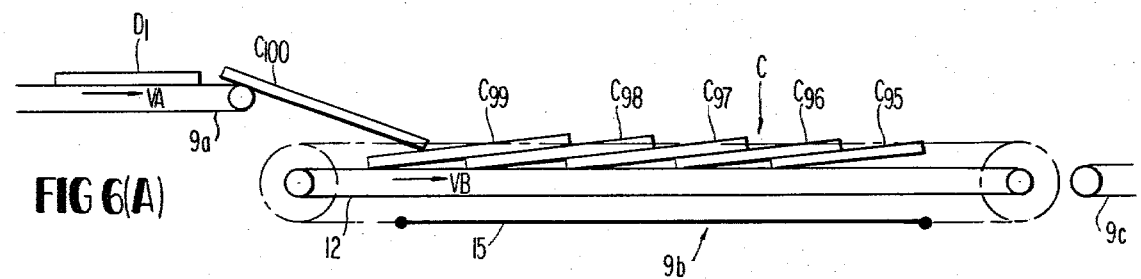
FIGS. 6(A), 6(B), 6(C), 6(D) and 6(E) illustrate several stages in the functioning of the conveyor device of this invention.
Figure 6B:
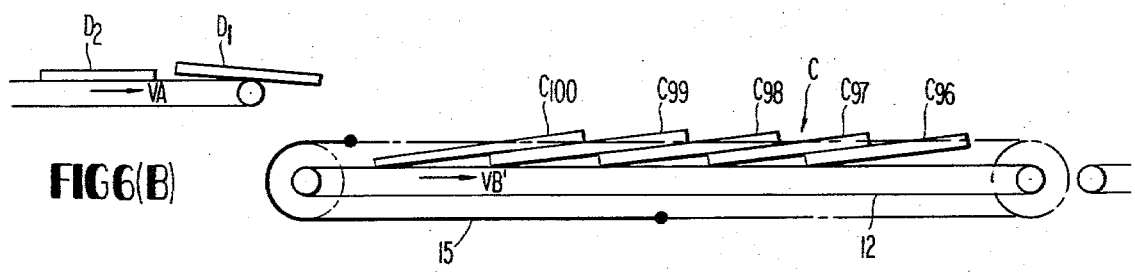

When, as shown in FIG. 6(B), the sheets or articles in the following batch D, which is to be separated from preceding batch C, are about to be supplied from supply conveyor 9a, the conveyor belt 15 is caused to be driven by the drive mechanism 27 at a speed such that its leading edge is aligned at the proper time with the leading edge of article $D_1$ of batch D. Where particularly accurate control is required a servo mechanism could be used; where precision control is not required a clutch could be employed effecting movement of the belt 15 at the proper time.

Figure 6C:
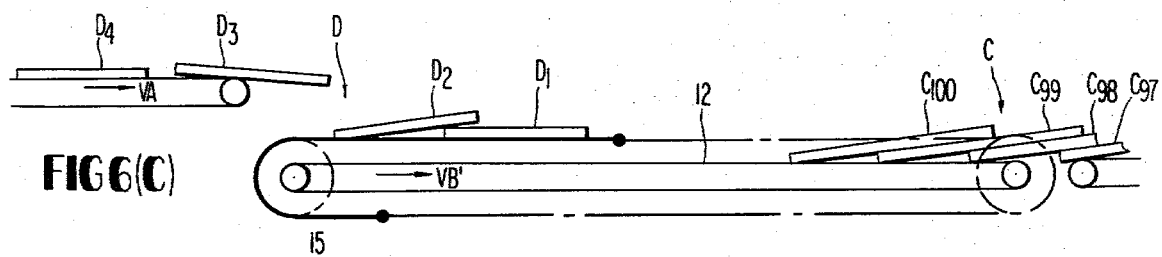

Referring now to FIG. 6(C) it can be seen that the articles in batch D are being transferred onto conveyor belt 15 while at the same time the last of the articles of batch C still remaining on belt 12 are being transferred by that belt to the transport conveyor 9c.

Figure 6D:
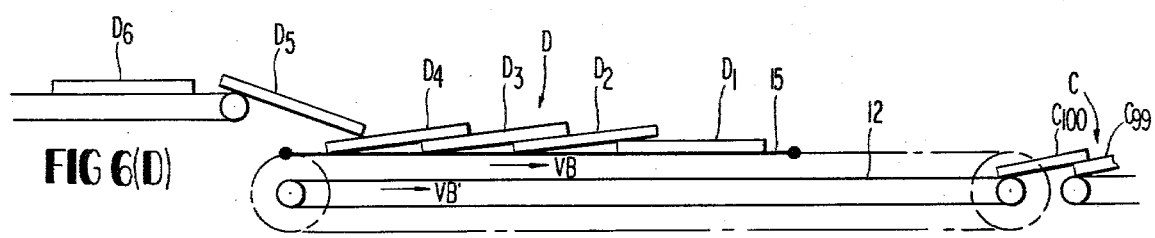
Figure 6E:
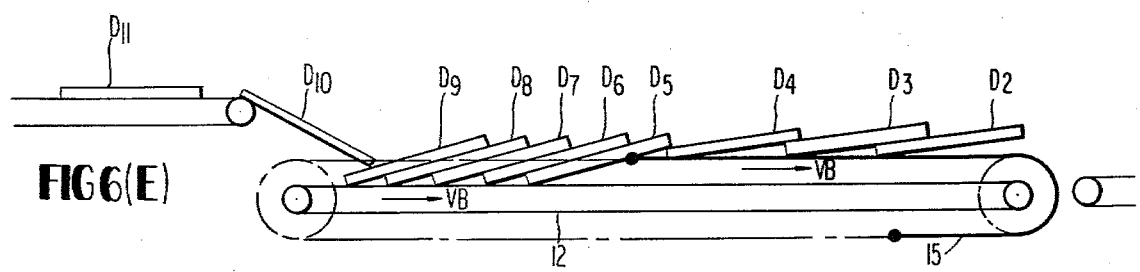

In the form of invention illustrated in FIGS. 6(A), 6(B), 6(C), 6(D) and 6(E) the endless belt 12 of the first conveyor is driven initially at a speed indicated as VB. As indicated previously, the belt 15 at that time is stationary, that is its speed is zero. When the belt 15 is moved to a position to receive the articles of batch D and the last article ($C_{100}$) of batch C has just been fed onto belt 12, the speed of belt 12 is increased to VB' to remove the remaining articles of batch C more quickly from belt 12 to the transport conveyor 9c. The belt 15 is driven during this time at a speed VB as indicated in FIG. 6(D). After the last article in batch C has been delivered to transport conveyor, the speed of the continuous belt 12 is reduced to its original speed VB and continues at that speed VB, as shown in FIG. 6(E). As further indicated in FIG. 6(E) the succeeding articles in batch D fall onto continuous belt 12 and are conveyed to transport conveyor 9c.

When the belts reach the position shown in FIG. 6(E), conveyor belts 12 and 15 are moving in concert at the speed VB. As the batch D fills the conveyor belt 15, the following articles begin falling on the lower conveyor belt 12. When the leading edge of the belt 15 reaches the original position shown in FIG. 6(A), one cycle has been completed and it stops at that point until further movement is required for effecting separation of a later batch of articles. The invention has been explained in terms of a double conveyor construction, but it will be apparent that three or more layers could be employed and implemented in the same manner as described above with respect to two layers.

As has been explained in detail above, the endless conveyor belt of this invention has at least one conveyor positioned for movement along a path extending beyond the outer circumference of the endless belt, so that subsequent batches may be separated from each other without stopping the continuous feed of the various conveyors. Thus, batches of articles may be separated and transported with a minimum of disarray or misalignment.

Also, it is possible to separately control the speed of each of the conveyors, so that by increasing the speed of the endless conveyor while the objects are being loaded on the partial one, a large interval between batches on the endless conveyor can be formed. This allows time for processing preparations to be made between orders. With this invention, therefore, there is an accurate sorting of articles such as flat objects or sheets, and this can be accomplished with a minimum of disarray. This invention can also be adapted to sorting (by leaving a space between) numerous objects being transported into groups such as corrugating machine stackers.

It is claimed:

1. A conveyor device for separating into separate batches articles continuously fed from one source, said conveyor device comprising:
    (a) a first conveyor including a continuous endless belt for receiving articles from the source and collecting the articles in a first batch;
    (b) two spaced rollers for mounting said first conveyor for movement about the axes of said rollers;
    (c) a second conveyor mounted for movement about said axes;
    (d) said second conveyor being arranged to travel along a path outside that of said first conveyor;
    (e) said second conveyor including an article-receiving portion extending along only part of the length of said second conveyor; and
    (f) said article-receiving portion being movable above said belt of said first conveyor for receiving articles from the source to collect the articles in a second batch.

2. The conveyor device of claim 1, and further including means for separately driving said first and second conveyors so that the relative speeds of said conveyors may be varied to bring said article-receiving portion of said second conveyor into its article-receiving position above said first conveyor at a desired time for separating said articles into batches.

3. The conveyor device of claim 2 wherein:
    (a) said second conveyor includes sprockets mounted for movement about said axes and two spaced chains engaging said sprockets and driven thereby, and
    (b) said article-receiving portion of said second conveyor comprises a second belt extending between said chains and connected thereto so as to be moved therewith.

4. The conveyor device of claim 3 wherein said sprockets have a diameter exceeding that of said rollers so that said second conveyor follows a path outside the path of said first conveyor.

5. The conveyor device of claim 3 wherein said sprockets are movable relative to said rollers whereby said first conveyor and said second conveyor may be driven at different speeds.

6. The conveyor device of claim 3 wherein said sprockets and chains are positioned laterally outwardly of said rollers and said second belt is wider than said endless belt.

7. The conveyor device of claim 2 wherein said first conveyor and said second conveyor are movable in the same direction.

8. The conveyor device of claim 7 wherein at least said first conveyor is continuously moving during the operation of said conveyor device.

9. The conveyor device of claim 2 wherein said first conveyor is driven at a speed greater than said second conveyor during the time articles are being received by said second conveyor.

10. The conveyor device of claim 2 wherein the articles are continuously delivered to either said first conveyor or said second conveyor for separation into batches without stopping the forward movement of the articles at any time.

* * * * *

UNITED STATES PATENT AND TRADEMARK OFFICE
CERTIFICATE OF CORRECTION

PATENT NO. : 4,238,024

DATED : December 9, 1980

INVENTOR(S) : Tadashi Hirakawa, Kiyomitsu Yoshikawa and Toshiaki Kusubayashi

It is certified that error appears in the above-identified patent and that said Letters Patent is hereby corrected as shown below:

In the heading on the first page, insert the following:

-- [30] Foreign Application Priority Data

July 17, 1978 [JP] Japan...................... 53-86985 --.

Signed and Sealed this

Seventeenth Day of June 1986

[SEAL]

Attest:

DONALD J. QUIGG

Attesting Officer

Commissioner of Patents and Trademarks